(12) United States Patent
Takechi

(10) Patent No.: US 6,920,426 B2
(45) Date of Patent: Jul. 19, 2005

(54) INFORMATION RANKING SYSTEM, INFORMATION RANKING METHOD, AND COMPUTER-READABLE RECORDING MEDIUM RECORDED WITH INFORMATION RANKING PROGRAM

(75) Inventor: Mineki Takechi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 09/834,633

(22) Filed: Apr. 16, 2001

(65) Prior Publication Data

US 2002/0004758 A1 Jan. 10, 2002

(30) Foreign Application Priority Data

Jul. 7, 2000 (JP) ........................................ 2000-206161

(51) Int. Cl.[7] ........................ G06F 17/60; G06F 17/30; G06F 7/00
(52) U.S. Cl. ............................................. 705/1; 707/3
(58) Field of Search ...................... 705/1, 26, 4; 707/3; 709/217; 14/73, 73.1, 77.1; 52/334, 335, 220.3

(56) References Cited

U.S. PATENT DOCUMENTS

| | | | | | |
|---|---|---|---|---|---|
| 6,014,639 | A | * | 1/2000 | Fohn et al. ..................... | 705/27 |
| 6,018,714 | A | * | 1/2000 | Risen et al. .................... | 705/4 |
| 6,240,408 | B1 | * | 5/2001 | Kaufman ....................... | 707/3 |
| 6,275,820 | B1 | * | 8/2001 | Navin-Chandra et al. ....... | 707/3 |
| 6,275,937 | B1 | * | 8/2001 | Hailpern et al. ............. | 713/188 |
| 6,285,999 | B1 | * | 9/2001 | Page .............................. | 707/5 |
| 6,356,899 | B1 | * | 3/2002 | Chakrabarti et al. ........... | 707/5 |
| 6,523,008 | B1 | * | 2/2003 | Avrunin et al. ............. | 704/273 |
| 6,591,261 | B1 | * | 7/2003 | Arthurs ......................... | 707/2 |
| 6,604,131 | B1 | * | 8/2003 | Warris et al. ............... | 709/205 |
| 6,792,458 | B1 | * | 9/2004 | Muret et al. ................ | 709/224 |
| 2001/0039563 | A1 | * | 11/2001 | Tian ........................... | 709/202 |
| 2002/0046203 | A1 | * | 4/2002 | Siegel et al. ................... | 707/1 |
| 2002/0073079 | A1 | * | 6/2002 | Terheggen ..................... | 707/3 |

FOREIGN PATENT DOCUMENTS

JP        11-220492 A    *    8/1999

OTHER PUBLICATIONS

Anon., "Inktomi Shares Tumble as Yahoo! Bowls a Google," Australian Financial Review, Jun. 28, 2000, p. 29.*
Sowards, S.W., "Save the Time of the Surfer" (Abstract), Library Hi Tech, vol. 15, No. 3–4, p. 155–158, 1997.*
Schmitt, J.P., ARt of collection Development, The (Abstract), Against the Grain, vol. 10, No. 2, p. 28, 30–31, Apr. 1998.*
Colaric, S.M., et al., "Speeding on the Inforamtion Superhighway: Strategies for Saving Time on the Web" (Abstract), Tech Trends, vol. 44, No. 6, p. 28–31, Nov. 2000.*

* cited by examiner

*Primary Examiner*—Nicholas D. Rosen
(74) *Attorney, Agent, or Firm*—Staas & Halsey LLP

(57) ABSTRACT

An information ranking system and an information ranking method as well as a computer readable recording medium recorded with an information ranking program, capable of ranking information resources on the Internet to thereby allow information users to estimate the factuality and reliability of the information.

6 Claims, 8 Drawing Sheets

```
<HTML>
<HEAD>
<TITLE>This is example</TITLE>
</HEAD>
<BODY>
<H1>DATE OF LAST UPDATE 2000.3.1</H1>
<A HREF="http://www.fujitsu.co.jp/">FUJITSU LIMITED</A>
<A HREF="http://www.komatta.page/"KOMATTA PAGE</A>
</BODY>
</HTML>
```

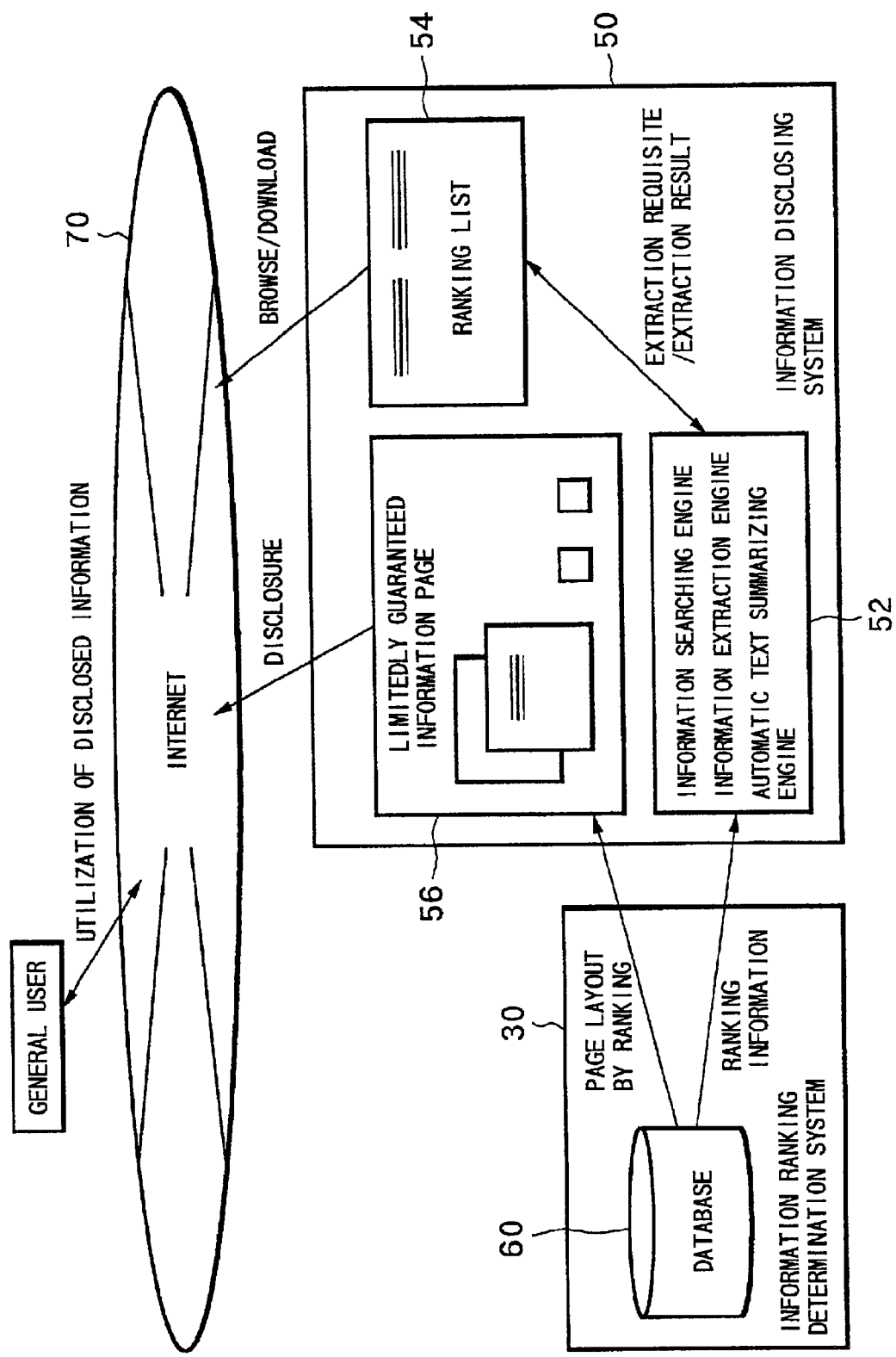

INFORMATION RANKING SYSTEM, INFORMATION RANKING METHOD, AND COMPUTER-READABLE RECORDING MEDIUM RECORDED WITH INFORMATION RANKING PROGRAM

(1) FIELD OF THE INVENTION

The present invention relates to a technique for ranking information resources on the Internet, based on the factuality and reliability of the information provided by the information resources.

(2) RELATED ART OF THE INVENTION

With the recent spread of the Internet, various information have been traded via the Internet, causing problems of the factuality and reliability of the information. The opened nature of the Internet rather brings about a flood of unmanaged information. In fact, searching information on the Internet by using an information search engine often results in listing of a lot of uncertain information. Such a nature considerably reduces "values of information" distributed on the Internet.

Attempts to define a "value of information" have been conducted by many pioneers, in the manners corresponding to the respective research objects. Particularly, as the information itself has been brought to be a subject of trading, such attempts have been conducted by those researchers of the industrial engineering and the information economy theory, due to the necessity of clearly defining the cost and price determining process of the information and calculating income and expenditure of specific trade of information. These attempts include a method for defining an information asset by an expected utility hypothesis, from an aspect of utility in employing the information.

However, before the utility of information itself, it is necessary to firstly confirm the factuality and reliability of the information, insofar as concerned with the employment of information on the Internet. It may be possible to confirm the factuality and reliability of information by manpower, as has been conducted since before the Internet came up. However, it has become difficult to deal with the explosively increasing Internet contents, by such a conventional method only. Irrespectively of such a situation, no schemes have been realized to automatically provide the common evaluation of the quality of information contents on the Internet by using universal criteria, so as to reduce the uncertainty of such information.

The present invention has been carried out in view of the conventional problems as described above, and it is therefore an object of the present invention to provide an information ranking technique for ranking information resources on the Internet to thereby allow information users to estimate the factuality and reliability of the information.

SUMMARY OF THE INVENTION

To this end, the information ranking technique according to the present invention is characterized in that contents-information concerning an investigation target page on the Internet is analyzed, and a ranked value indicating the factuality and reliability of the investigation target page is calculated based on the analysis result. The investigation target page is preferably designated by a user.

According to such a constitution, contents-information concerning pages as information resources distributed worldwide via the Internet are analyzed, and a ranked value indicating the factuality and reliability of each page is calculated. This allows a private user, who intends to utilize an on-line shop, to estimate the factuality and reliability of a pertinent page based on the calculated ranked value of the page. Further, this allows a business user desiring a higher rank of the own page, to obtain an objective estimation of the own page based on the calculated ranked value. Since a user is allowed to designate an investigation target page, the user is released from a burden to find out a ranked value concerning a desired page among an enormous number of pages, thereby providing a useful expedient for the user.

Further, in the information ranking technique according to the present invention, ranking guarantee data of an investigation target page may be prepared based on the calculated ranked value, to send this data to a user. In this case, a guarantee fee to be due to the user who has designated the investigation target page may be determined, to send the payment details to the user.

According to such a constitution, the user who has designated the investigation target is allowed to receive the ranking guarantee data corresponding to the ranked value, to thereby understand the factuality and reliability of the investigation target page at a glance. Further, by sending the fee imposition details of the guarantee fee to the user who has designated the investigation target page, it becomes possible to provide an information ranking service as business.

It is also possible to receive an information offer concerning a page on the Internet, and to determine an information offer reward corresponding to the information offer to pay this reward to an information provider.

According to such a constitution, a lot of information offers from many users can be expected, thereby suitably updating and expanding the information for calculating the ranked values.

Moreover, the calculated ranked value may be stored in a database, to disclose the stored ranked value to the public.

According to such a constitution, the ranked value stored in the database is disclosed to the public, to thereby contribute to the expediency of users utilizing the information on the Internet.

Further objects and aspects of the present invention will become more apparent from the following description of the preferred embodiment when read in conjunction with the accompanying drawings.

BRIEF EXPLANATION OF THE DRAWINGS

FIG. 9 is an explanatory view of an information disclosing procedure.

PREFERRED EMBODIMENT

Firstly explaining the outline of the present invention, an information ranking system of the present invention serves as an infrastructure for guaranteeing the factuality and reliability of information resources on the Internet. Namely, this information ranking system conducts an investigation and an analysis of a page for which a user requests an investigation over the worldwide sites on the Internet, to thereby conduct the ranking for allowing an estimation of the factuality and reliability of the information in that page. Further, the information ranking system sends ranking guarantee data corresponding to the ranking to the investigation-requester, and charges him/her a guarantee fee as a counter value. The information ranking system further pays a counter value to a provider who has offered the system the information useful for ranking a page, corresponding to the usefulness of the offered information. Moreover, the information ranking system discloses the information concerning those pages having been ranked, on the Internet to the public.

There will be hereinafter described in detail the present invention with reference to the accompanying drawings.

Figure 1:
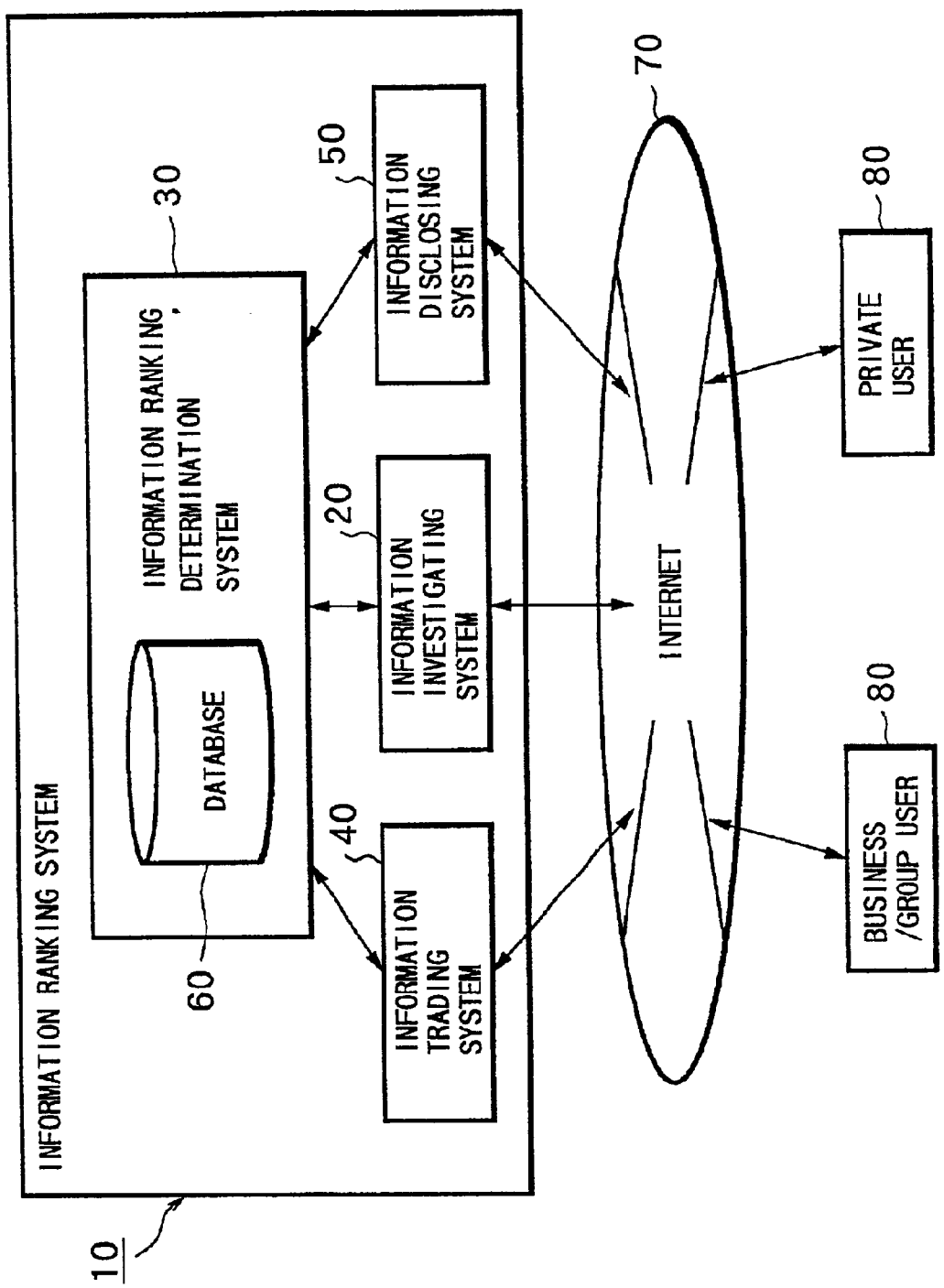
FIG. 1 is an entire constitutional view of an information ranking system according to the present invention.

FIG. 1 shows an entire constitution of the information ranking system of the present invention constructed on a computer including at least a central processing unit (CPU) and a memory.

The information ranking system 10 comprises four sub-systems such as an information investigating system 20, an information ranking determination system 30, an information trading system 40 and an information disclosing system 50. In each sub-system, the following functions are realized by software in accordance with a program loaded on the memory.

In the information investigating system 20, those contents-information concerning pages on the Internet as investigation targets are collected and analyzed, to thereby generate ranking basis information for conducting the information ranking. As the ranking basis information, for example, a contents-coincidence, an accumulated access index and a linked information ranking accumulation are adopted, which are considered to reflect the factuality and reliability of the pertinent page. Here, the term "contents-coincidence" means a variable indicating whether or not a preparation history of the page coincides with a time stamp of the file for the page, and is set to 1 in case of coincidence and to 0 in case of discrepancy. The term "accumulated access index" means a variable indicating the number of visitors of the page during a predetermined period of time, and is set to, for example, a value obtained by dividing the actual number of visitors by a predetermined number (such as 1,000). The term "linked information ranking accumulation" means a variable indicating that the factuality and reliability of an investigation target page is changed corresponding to the factuality and reliability of linked pages, and is set to, for example, a value obtained by summing up ranked values (to be described later) of the linked pages. In the information investigating system 20, information analyzing means, an information analyzing process and an information analyzing function are realized by software.

In the information ranking determination system 30, a ranked value of the investigation target page is calculated in accordance with a procedure to be described later, based on the ranking basis information generated by the information investigating system 20. The thus calculated ranked value and the ranking basis information (hereinafter collectively called "ranking information") are accumulated into a database 60 provided in the information ranking determination system 30. In the information ranking determination system 30, ranked value calculating means, a ranked value calculating step and a ranked value calculating function are realized by software.

In the information trading system 40, a response to an information ranking request or to an information offer from a user is made. Namely, when the information ranking request is made by a user 80 to the information trading system 40 via the Internet 70, the information ranking determination system 30 is activated to calculate a ranked value of the requested investigation target page. Then, ranking guarantee data (details thereof will be described later) is issued to the user 80, and a guarantee fee as a counter value is imposed on the user 80. Conversely, when useful information is offered by the user 80 to the information trading system 40 via the Internet 70, an information offer reward is paid to this user 80 corresponding to the ranked value of the offered information. In the information trading system 40, guarantee data preparing means, guarantee data sending means, guarantee fee determining means, fee imposition detail sending means, information offer receiving means, information offer reward determining means and information offer reward paying means are realized by software.

In the information disclosing system 50, those ranking information accumulated in the database 60 are disclosed to public users via the Internet 70. In the information disclosing system 50, information disclosing means is realized by software.

Figure 2:
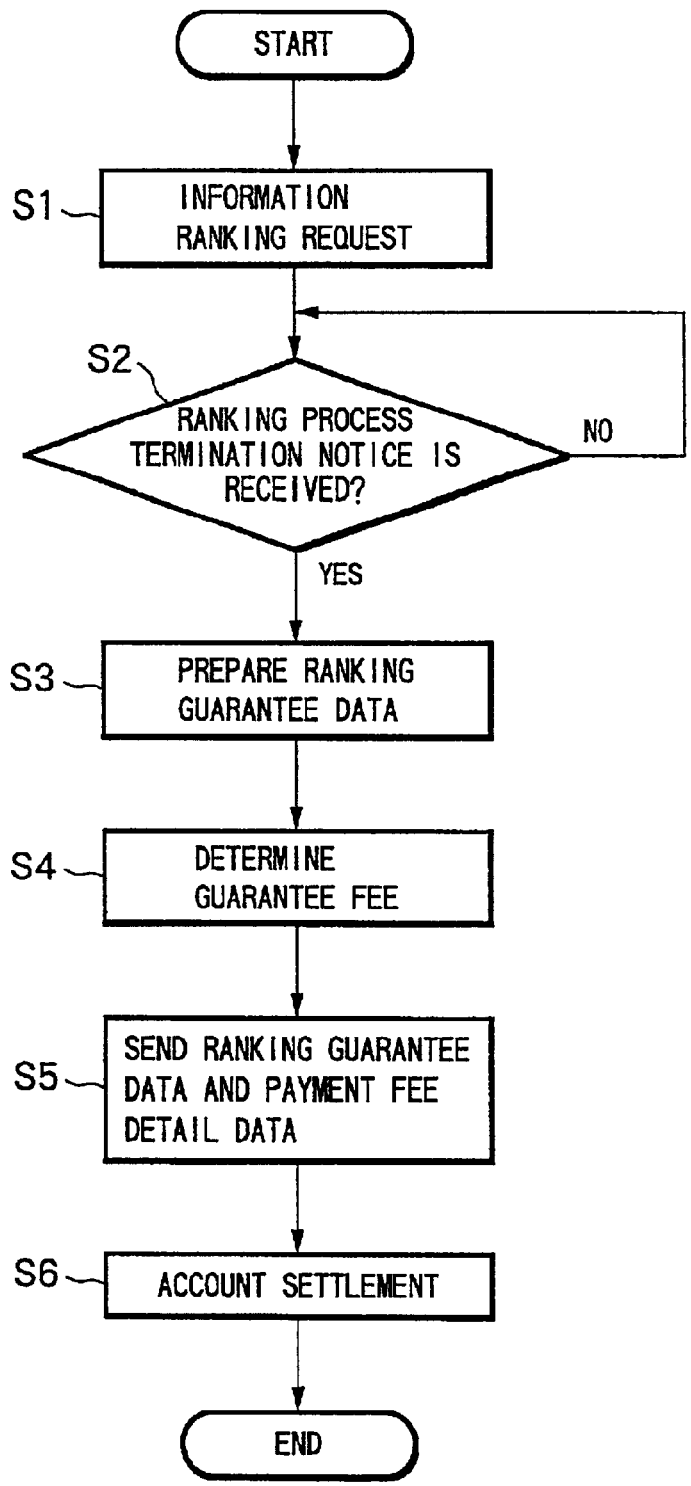
FIG. 2 is a flowchart showing a procedure to be conducted when the information ranking is requested to an information trading system.
Figure 3:
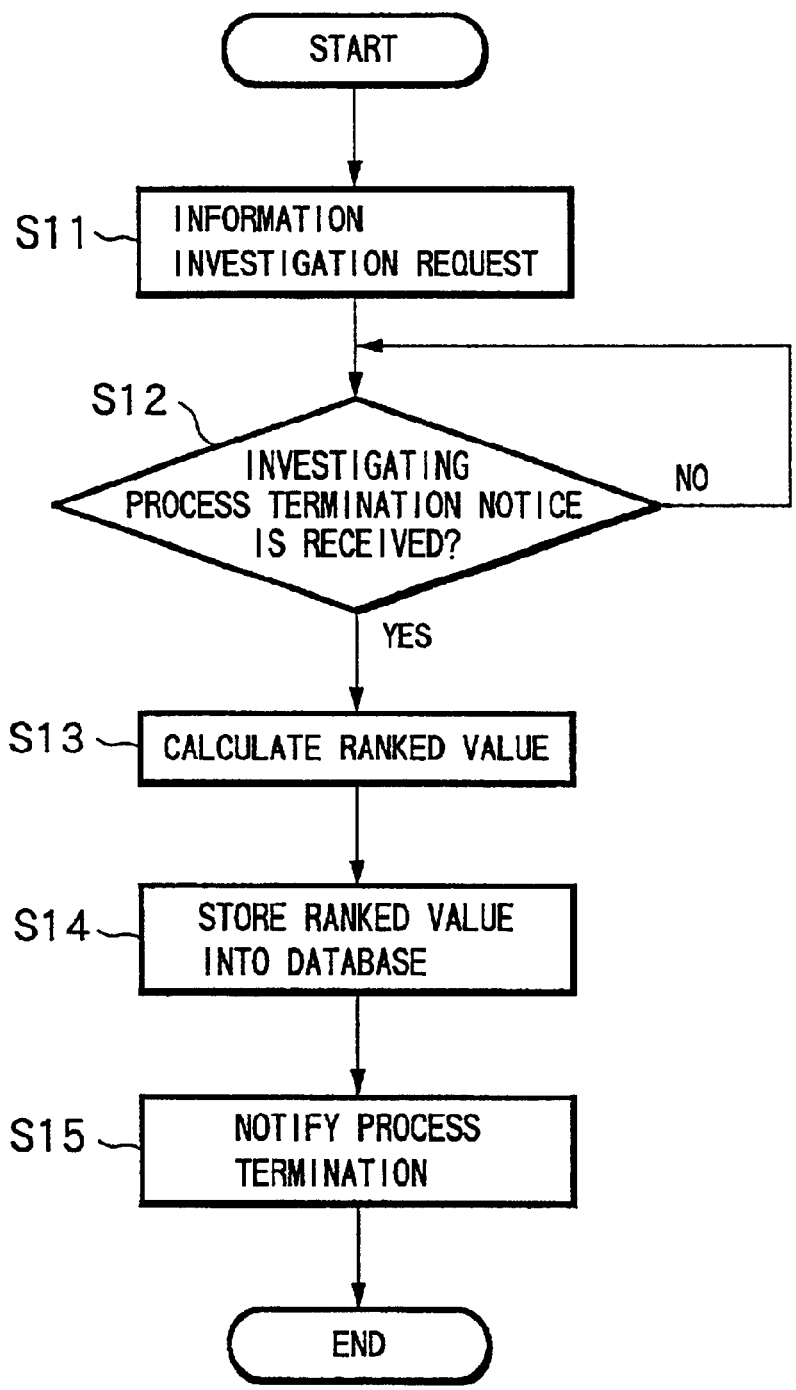
FIG. 3 is a flowchart showing a procedure in an information ranking determination system.
Figure 4:
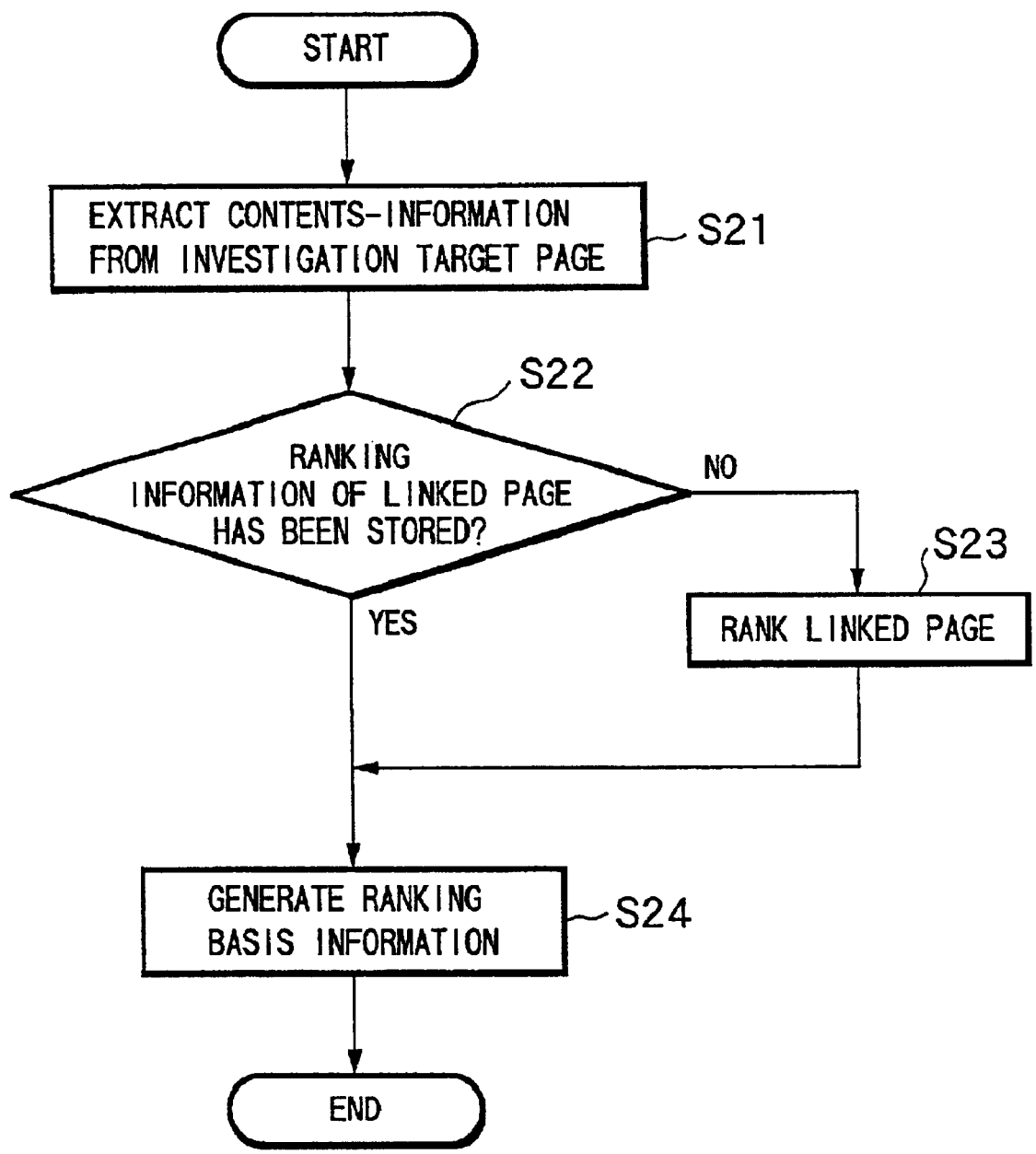
FIG. 4 is a flowchart showing a procedure in an information investigating system.

There will be now described procedures to be conducted when the information ranking request is made to the information trading system 40, with reference to flowcharts shown in FIGS. 2 through 4. As information ranking requesters, there can be exemplarily assumed a private user desiring to confirm the safety of a site before visiting it for on-line shopping, and a business user desiring a higher rank of the own site. In each situation, a site as an investigation target is designated, and the information ranking is requested to the information trading system 40.

When the information ranking request is made to the information trading system 40, firstly a procedure of a flowchart shown in FIG. 2 is executed.

At step 1 (abbreviated to "S1" in the figure; and the same rule applies corresponding to the following), the information ranking for an investigation target site is requested to the information ranking determination system 30.

At step 2, it is judged whether or not a ranking process termination notice has been received from the information ranking determination system 30. The "ranking process termination notice" is notice information indicating that the calculation of the ranked value has been terminated in the information ranking determination system 30 and the resultant ranking information has been stored into the database 60. The flow advances to step 3 if the ranking process termination notice has been received (Yes), while the procedure of step 2 is repeated if the ranking process termination notice has not been received yet (No).

At step 3, the database 60 provided in the information ranking determination system 30 is searched for, to thereby prepare ranking guarantee data for the investigation target site. The "ranking guarantee data" is a certificate for giving, by the information ranking system 10, a guarantee of the factuality and reliability of the site requested by the information ranking requester for a predetermined period of time from the ranking completion date. The procedure at step 3 corresponds to the guarantee data preparing means.

At step 4, a guarantee fee as a counter value for the ranking request is determined corresponding to the ranking guarantee data. The procedure at step 4 corresponds to the guarantee fee determining means.

At step 5, the prepared ranking guarantee data as well as fee imposition detail data concerning the guarantee fee are sent to the information ranking requester by an e-mail. The procedure at step 5 corresponds to the guarantee data sending means and the fee imposition detail sending means.

At step 6, the account settlement by the information ranking requester is conducted.

According to the procedure at steps 1 through 6 as described above, the information ranking requester is possible to receive the ranking guarantee data by an e-mail, by designating the investigation target site to thereby request the information ranking to the information trading system 40. Then, the information ranking requester becomes capable of estimating the factuality and reliability of the site where he/she plans to utilize, or estimating the objective judgment on the own site of the requester, based on the ranking guarantee data.

Meanwhile, since the fee is imposed onto the information ranking request, business utilizing the information ranking system 10 is realized. In this respect, the information ranking system 10 certainly serves as an infrastructure having higher public nature. However, it is extremely problematic for official organizations or volunteers to play such a role, because the benefit recipients are limited to those users of the Internet, and because fund investment is continuously required in developing an investigation method and in maintaining and updating the system. Further, to follow up the technological revolution of the drastically changing Internet, the system may be rather realized as business in order to improve more rapidly the service. As such, the information ranking service as business will rather enable provision of the most advanced service along the social demand, to thereby fully satisfy the users of the information ranking system 10.

FIG. 3 shows a procedure in the information ranking determination system 30.

At step 11, the information investigation is requested to the information investigating system 20.

At step 12, it is judged whether or not an investigating process termination notice has been received from the information investigating system 20. The "investigating process termination notice" is notice information indicating that the investigation of the investigation target site has been completed at the information investigating system 20. The flow advances to step 13 if the investigating process termination notice has been received (Yes), while the procedure of step 12 is repeated if the investigating process termination notice has not been received yet (No).

At step 13, a ranked value of the investigation target site is calculated based on the ranking basis information generated by the information investigating system 20. The calculating method of the ranked value will be described in the explanation of the procedure at the information investigating system 20 to be described later. The procedure at step 13 corresponds to the ranked value calculating means, the ranked value calculating step and the ranked value calculating function.

At step 14, the calculated information ranked value and the ranking basis information, i.e., the ranking information, are stored into the database 60.

At step 15, the ranking process termination notice is sent to the system that has requested the information ranking.

According to the procedures at steps 11 through 15 as described above, the ranked value reflecting the factuality and reliability of the investigation target site is calculated based on the ranking basis information generated by the information investigating system 20. Further, the ranking information is stored into the database 60, and the ranking process termination notice is sent to the system that has requested the information ranking.

FIG. 4 shows a procedure in the information investigating system 20. The series of procedures shown in FIG. 4 correspond to the information analyzing means, the information analyzing process and the information analyzing function.

Figure 5:
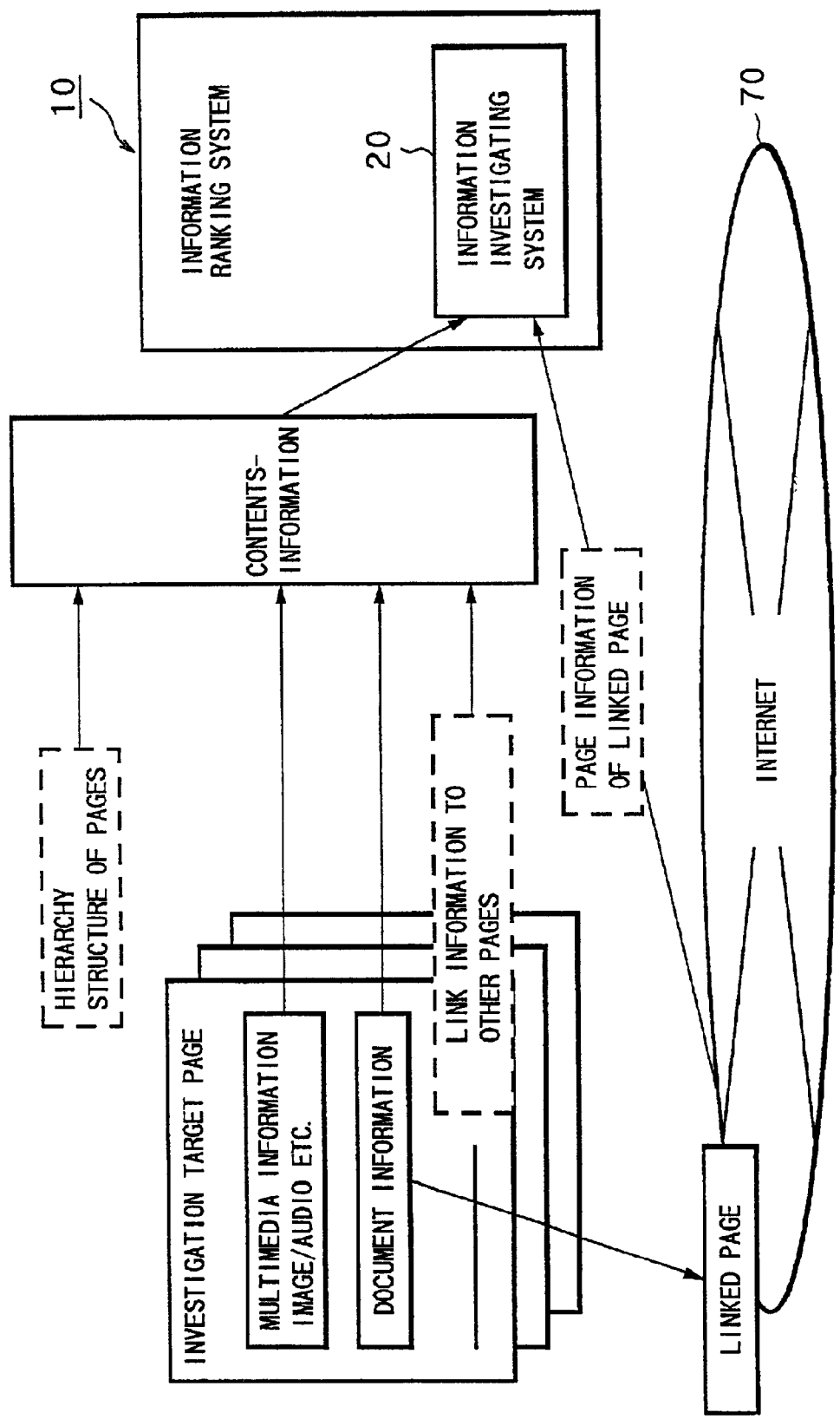
FIG. 5 is an explanatory view of a contents-information collecting procedure.

At step 21, contents-information is extracted from an investigation target page. Namely, pages on the Internet are described in a computer language called "markup language". As shown in FIG. 5, described in such a page are: a file name and a directory structure of the texts or contents of the page; META information of the each contents; link information to other pages; and preparation history, creator's name, and created date of the page. Further, an actual file structure, a time stamp of the file and the like are extracted, by using a temporary log-in account on the Web server in which the investigation target page exists.

At step 22, it is judged whether or not the ranking information of a linked page has been stored in the database 60, based on the link information described in the investigation target page. Namely, it is judged whether or not the linked page has been ranked in the past. The flow advances to step 24 if the ranking information has been stored in the database 60 (Yes), while the flow advances to step 23 if such ranking information is not stored in the database 60 (No).

At step 23, the linked page is ranked, before ranking the investigation target page. Namely, the information ranking is requested to the information ranking determination system 30, by designating the linked page. In this way, the ranking information of the linked page is stored into the database 60.

At step 24, ranking basis information of the investigation target page is generated based on the extracted contents-information and based on the ranking information of the linked page stored in the database 60.

According to the procedure of the steps 21 through 24 as described above, the ranking basis information is generated as follows.

Figures 6, 7:
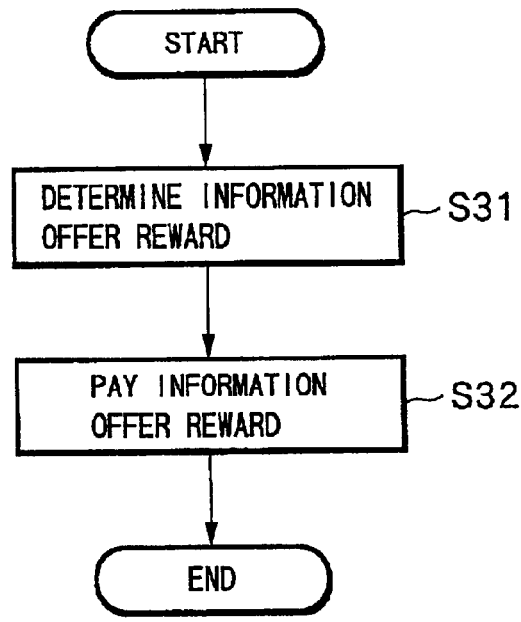
FIG. 6 is an explanatory view of a file described in an HTML showing an example of a home page (index.html) as an investigation target.
FIG. 7 is a flowchart showing a procedure to be conducted when information is offered to the information trading system.

Each home page on the Internet is typically constituted based on a file named "index.html" so as to include links to other pages. When the investigation target page (index.html) is described in the HTML (Hypertext Markup Language) as shown in FIG. 6, various information required for generating the ranking basis information can be extracted, by using a known information extraction technique or a known information searching technique. In the example shown in FIG. 6, the terms "Last Update Date", "A HREF="http://www.fujitsu.co.jp/", and "A HREF="http://www.komatta.page/" are extracted. Further, the time stamp of the index.html file is extracted by remotely logging into the Web server by using a temporary log-in account. Moreover, the accumulation of the number of accesses during a fixed period of time is extracted from an access log file recorded with the visited history of the investigation target page. Still further, a ranked value indicating a ranked rank value of the page is calculated based on the extracted various information. It is assumed herein that a larger value indicates a higher ranked value.

In calculating the ranked value, it is assumed that the ranked values of the linked pages "FUJITSU LIMITED" and "komatta page" have been established to be 10 and 0, respectively, such as by the past investigation. It is further assumed that the actual investigation of the pertinent file in the Web server shows that the time stamp of the index.html file is Mar. 1, 2000, and the analysis of the access log file shows accesses of 10,000 times/month. Note, when the ranking information of the pages "FUJITSU LIMITED" and/or "komatta page" have not been stored, the ranked values for these pages are firstly calculated.

As the ranking basis information, the "contents-coincidence", "accumulated access index" and "linked information ranking accumulation" are generated as follows:

Contents-coincidence: a=1 (coincidence);

Accumulated Access Index: b=10,000÷1,000=10; and

Linked Information Ranking Accumulation: c=10+0=10.

Thereafter, the ranked value is calculated at the information ranking determination system 30 based on the ranking basis information, as follows:

Ranked Value=Contents-coincidence×Accumulated Access Index× Linked Information Ranking Accumulation =a×b×c

=1×10×10

=100.

The past ranking information to be used in the procedure for calculating the ranked value comprises, in addition to the ranking information obtained by the aforementioned method, those ranking information the reliability of which has been confirmed by an off-line investigation. As the ranking by the off-line investigation, there can be envisaged such a method: to add a certain ranked value as an initial value to a site of a listed enterprise; or to take out as actual results such as a license number of the Building Lots and Buildings Transaction Business Law indicating the length of the working years, to reflect on an initial ranked value, in case of a site concerning real estate business. It should be noted that the calculation of the ranked value is so simplified for explanation herein. As such, the calculating method of the ranked value should be carefully reviewed in the actual ranking.

There will be now described a procedure when an information offer is made to the information trading system 40, with reference to a flowchart shown in FIG. 7. The information trading system 40 also functions as the information offer receiving means.

At step 31, an information offer reward is determined based on the ranked value of the offered information. The procedure at step 31 corresponds to the information offer reward determining means.

At step 32, the information offer reward is paid. The procedure at step 32 corresponds to the information offer reward paying means.

According to the procedure at steps 31 and 32 as described above, when information is offered by a user 80 via the Internet 70, the information offer reward as a counter value is paid. Thus, there can be expected a lot of information offers from many users, thereby suitably updating and expanding the ranking information stored in the database 60.

The information ranking system 10 is provided with not only the aforementioned function to respond to the information ranking request and the information offer, but also a function to disclose the ranking information stored in the database 60 via the Internet 70. The disclosing methods include two methods: one to disclose a ranking list; and the other to disclose a limitedly guaranteed information page. Such a function is provided by the information disclosing system 50 acting as a man-machine interface for a user.

Figure 8:
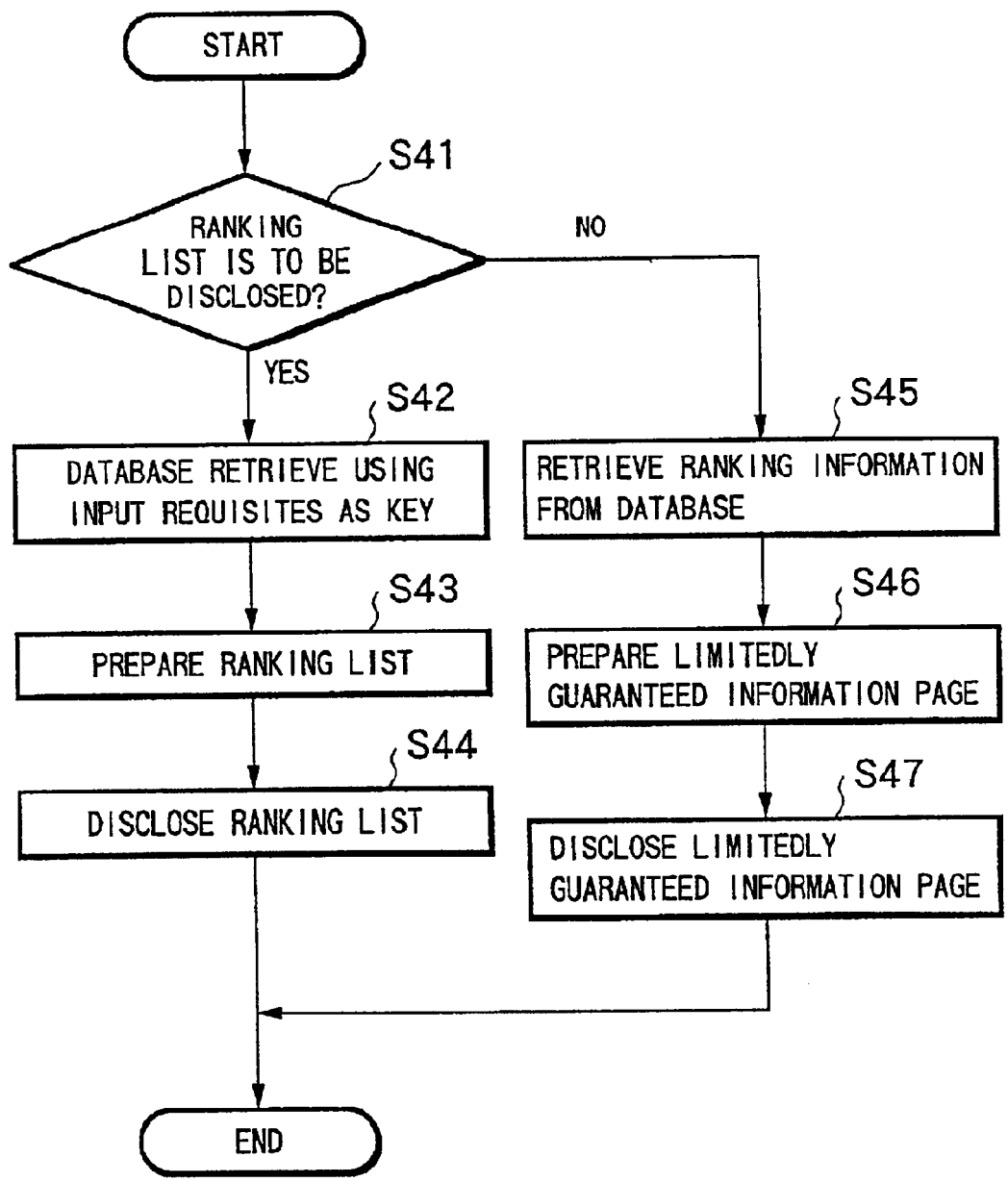
FIG. 8 is a flowchart of a procedure in an information disclosing system.

FIG. 8 shows a procedure in the information disclosing system 50. The procedure shown in FIG. 8 corresponds to the information disclosing means.

At step 41, it is judged whether or not the user's designated disclosing method is that by the ranking list. The flow advances to step 42 if it is the case (Yes), while the flow advances to step 45 if it is not the case, i.e., if the user's designated disclosing method is that by the limitedly guaranteed information page (No).

At steps 42 through 44, the ranking information by the ranking list is disclosed. Note, the ranking list is prepared based on the requisites input by a user on a disclosed home page of the information ranking system 10.

Namely, at step 42, various information matching with the user's input requisites are searched for in the database 60 as shown in FIG. 9, by various engines 52 such as an information search engine, an information extraction engine and an automatic text summarizing engine. At step 43, a ranking list 54 is prepared based on the searched various information. At step 44, the prepared ranking list 54 is disclosed to users via the Internet 70.

On the other hand, at steps 45 through 47, the ranking information by a limitedly guaranteed information page is disclosed. In this respect, the ranking information provides a limited guarantee of the factuality and reliability of target information, since there are limitations of the factuality and reliability of the target information which can be investigated on the Internet 70. The page layout of the limitedly guaranteed information page is determined by a known technique, corresponding to the ranking information accumulated in the database 60. The individual ranking information on this page are laid out such that the differences among respective rankings can be understood at a glance such as by the inserted positions and the sizes of heading fonts of the ranking information, like a current newspaper face. Further, the limitedly guaranteed information page acts as not only a simple information newspaper face, but also a link collection to those information the factuality and reliability of which are guaranteed, to thereby function as a portal site.

Namely, at step 45, the ranking information accumulated in the database 60 is searched for as shown in FIG. 9. At step 46, the page layout is determined corresponding to the searched ranking information, to thereby prepare a limitedly guaranteed information page 56. At step 47, the prepared limitedly guaranteed information page 56 is disclosed to users via the Internet 70.

According to the procedure at steps 41 through 47 as described above, the ranking information accumulated in the database 60 are disclosed to the public, to thereby contribute to the expediency of users utilizing the information on the Internet.

By recording a program for realizing such functions into a computer-readable recording medium such as a magnetic tape, magnetic disk, magnetic drum, IC card, CD-ROM, and DVD-ROM, the information ranking program according to the present invention can be distributed into the market. Further, those who have obtained such a recording medium are allowed to readily construct the information ranking system according to the present invention, making use of a general computer system.

What is claimed:

1. An information ranking system comprising:

information analyzing means for analyzing contents-information concerning an investigation target page on the Internet, said investigation target page being designated by a user;

ranked value calculating means for calculating a ranked value indicating the factuality and reliability of said investigation target page, based on the analysis result of said information analyzing means;

guarantee data preparing means for preparing ranking guarantee data of said investigation target page, based on the ranked value calculated by said ranked value calculating means; and guarantee data sending means for sending the ranking guarantee data prepared by said guarantee data preparing means to the user who has designated said investigation target page.

2. An information ranking system of claim 1, further comprising:

guarantee fee determining means for determining a guarantee fee to be imposed on the user who has designated said investigation target page; and fee imposition detail sending means for sending fee imposition details determined by said guarantee fee determining means, to the user who has designated said investigation target page.

3. An information ranking system of claim 1, further comprising:

information offer receiving means for receiving an information offer concerning a page on the Internet;

information offer reward determining means for determining an information offer reward corresponding to the information received by said information offer receiving means; and information offer reward paying means for paying the information offer reward determined by said information offer reward determining means to an information provider.

4. An information ranking system of claim 1, further comprising:

a database for storing the ranked value calculated by said ranked value calculating means; and information disclosing means for disclosing the ranked value stored in said database.

5. A computer-implemented information ranking method comprising:

analyzing contents-information concerning an investigation target page on the Internet, the investigation target page being designated by a user; and calculating a ranked value indicating the factuality and reliability of said investigation target page, based on the analysis result of said analyzing;

preparing ranking guarantee data of the investigation target page, based on the ranked value calculated by said calculating; and sending the ranking guarantee data prepared by said preparing to the user who has designated the investigation target page; wherein at least one of said analyzing, said calculating, and said preparing is carried out by a computer.

6. A computer-readable recording medium recorded with an information ranking program for causing a computer to execute:

analyzing contents-information concerning an investigation target page on the Internet, the investigation target page being designated by a user;

calculating a ranked value indicating the factuality and reliability of said investigation target page, based on the analysis result of said analyzing;

preparing ranking guarantee data of the investigation target page, based on the ranked value calculated by said calculating; and sending the ranking guarantee data prepared by said preparing to the user who has designated the investigation target page.

* * * * *